United States Patent [19]

Baciu et al.

[11] Patent Number: 4,522,778

[45] Date of Patent: Jun. 11, 1985

[54] METHOD AND APPARATUS FOR THE INJECTION MOULDING OF PLASTICS ARTICLES

[75] Inventors: Antoine Baciu, Anbevoye; Jean M. Rius, Romainville; Bernard Sivry, Paris, all of France

[73] Assignee: Cibie Projecteurs, France

[21] Appl. No.: 604,738

[22] Filed: Apr. 27, 1984

[30] Foreign Application Priority Data

Apr. 28, 1983 [FR] France ................................. 83 07029

[51] Int. Cl.³ .............................................. B29F 1/06
[52] U.S. Cl. ................................. 264/328.7; 264/537; 425/533; 425/577
[58] Field of Search ................. 264/328.7, 537, 328.12; 425/533, 577

[56] References Cited

U.S. PATENT DOCUMENTS

| | | | |
|---|---|---|---|
| 2,999,273 | 9/1961 | Gronemeyer et al. | 425/577 |
| 3,281,514 | 10/1966 | Polka | 425/577 X |
| 3,503,095 | 3/1970 | Uhlig | 425/577 X |
| 3,906,066 | 9/1975 | Barrie | 264/328.12 X |
| 4,071,532 | 1/1978 | Rose | 264/328.7 |
| 4,092,385 | 5/1978 | Balevski et al. | 264/328.7 X |
| 4,150,088 | 4/1979 | Chang et al. | 264/328.12 |
| 4,201,535 | 5/1980 | Ninneman | 425/577 X |
| 4,332,545 | 6/1982 | Cargile | 425/577 |
| 4,432,530 | 2/1984 | Marcinek | 425/577 X |

Primary Examiner—J. Howard Flint, Jr.
Attorney, Agent, or Firm—McCormick, Paulding & Huber

[57] ABSTRACT

A method and apparatus for the production of parts made from plastics material using an injection press in which the mould cavity is defined by a mould surface Sca and the surface Sve of a movable piston. Firstly, the material is introduced into the mould cavity and during injection, the piston is kept stationary for a time to form a rough mould and then retracted to form a parison. Secondly, after injection has been completed the piston is advanced again, and maintained in position while cooling takes place. Thirdly, the mould is opened and the part ejected.

11 Claims, 2 Drawing Figures

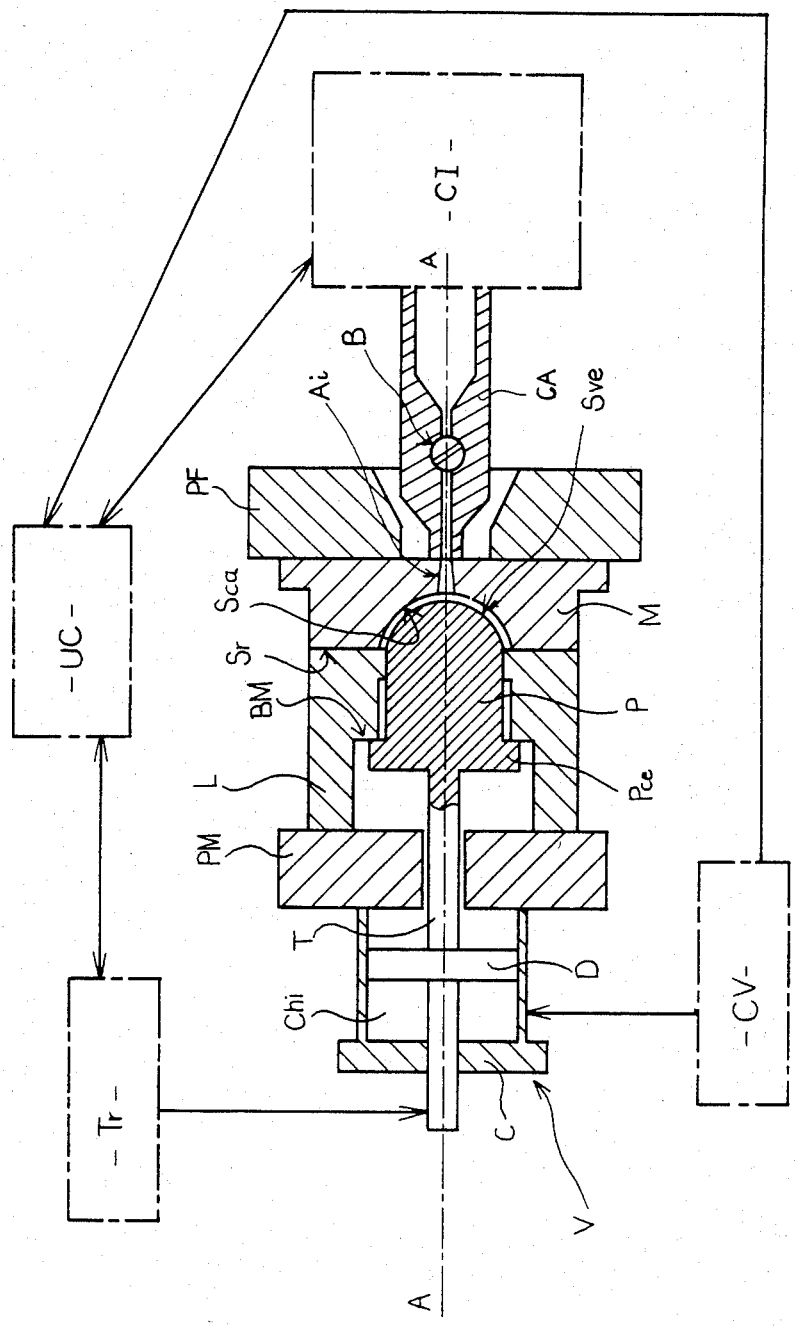
FIG_1

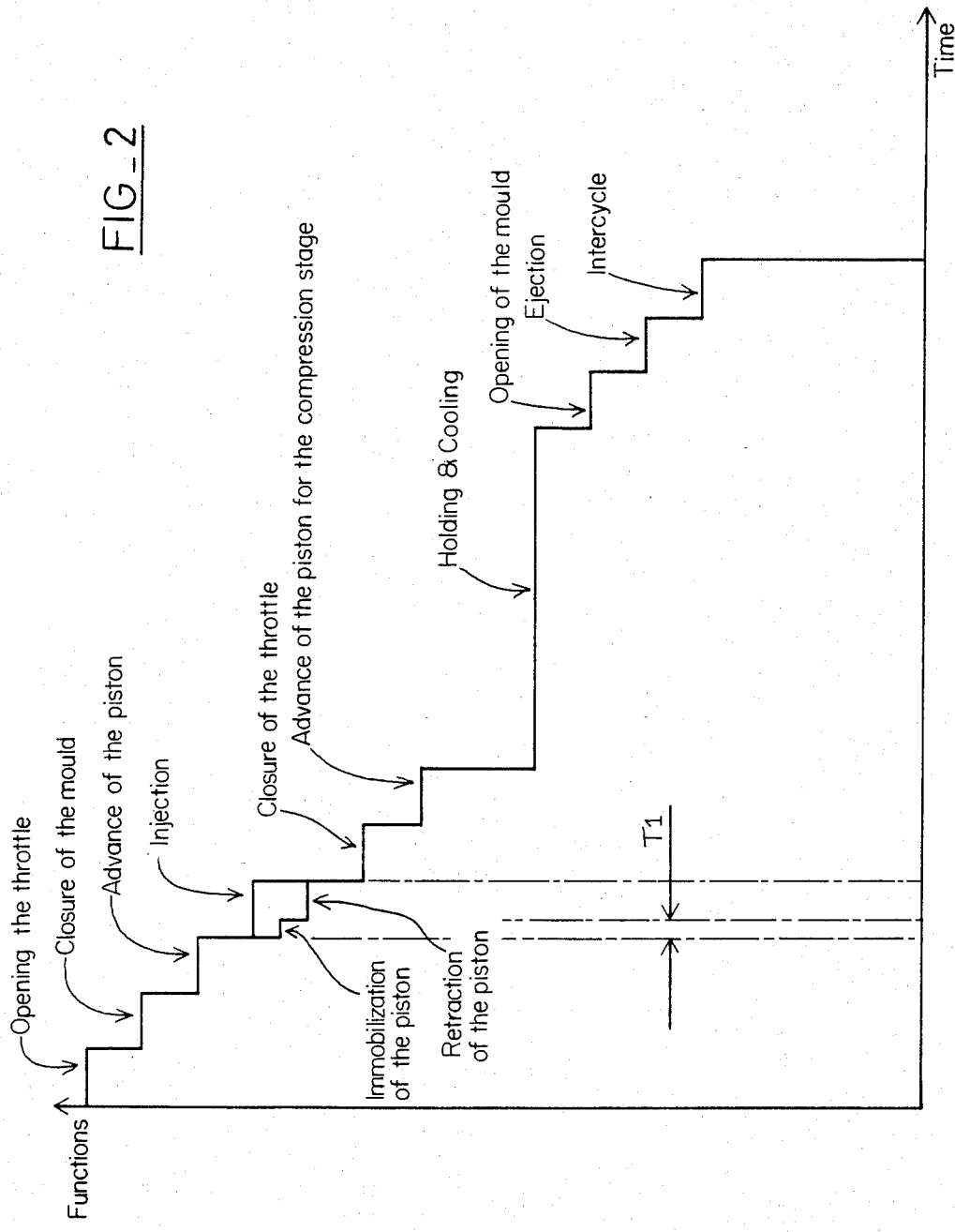
FIG_2

METHOD AND APPARATUS FOR THE INJECTION MOULDING OF PLASTICS ARTICLES

BACKGROUND OF THE INVENTION

The present invention relates to a method of producing parts made from plastics material by injection moulding and to apparatus for carrying out this method.

More specifically, the present invention is concerned with the production of parts made from plastics material having a small thickness.

The present invention relates in particular, but not exclusively, to the production of reflector bodies intended to be provided at a later stage with a reflective coating for signalling or lighting equipment to be used on automobiles.

Numerous methods and apparatus have already been proposed for the production of parts made from plastics material by injection of this material into a mould. However, in this case of parts having small thicknesses, it has proved difficult to ensure a perfect uniform filling of the mould with the plastics material.

As described for example in U.S. Pat. Nos. 2,999,273 and 3,906,066, it has been proposed to inject the material into a mould cavity whose volume can be varied by the displacement of a piston in the direction of the axis of injection in order to form a parison, then to move the piston closer to the opposite surface of the mould in order to compress the parison and shape each part into its final form.

SUMMARY OF THE INVENTION

It is an object of the present invention to propose a method which makes it possible to improve the quality of the parts thus obtained.

It is a further object of the present invention to produce parts made from plastics material which meet the sizes and dimensions stipulated with a very high degree of precision.

It is a still further object of the present invention to produce parts made from plastics material having a small thickness which have a surface of excellent quality, devoid in particular of marks, tracks, undulations in the surface or the like, and having an accurately constant thickness.

These characteristics must be met in particular in the case of reflectors for automobile signalling or lighting equipment in order to provide a totally reliable guarantee of conformity with administrative standards.

Yet another object of the present invention is to produce parts made from plastics material without internal stresses.

Finally, it is also an object of the present invention to facilitate an increased rate of production as well as low production costs.

According to one aspect of the invention there is provided a method of producing a part from a plastics material which comprises a first stage in which a parison is formed by the injection of the plastics material into a mould of an injection press, the cavity of which is defined by two principal surfaces facing one another, one of which is constituted by a piston which is movable along the axis of injection to vary the volume of the cavity; the first stage comprising successively:

(a) an immobilisation of the piston a short distance $d_o$ from the opposite principal surface of the mould in order to form a rough model of the parison which is substantially symmetrical about the axis of injection and which has substantially identical contact diameters on each of the two principal surfaces, then (b) a retraction of the piston to move it away from the opposite principal surface at such a speed that on the one hand the rough model of the parison is not reduced in diameter and on the other hand the respective contact diameters on each of the two principal surfaces are constantly substantially equal to each other and between a constant value and an increasing linear variation as a function of the thickness of the rough model of the parison; and a second stage in which the piston is moved towards the opposite principal surface of the mould thereby compressing the parison and shaping the part into its final form.

This is in contrast to methods previously proposed which consist of a first stage in which a predetermined volume of material is introduced into the interior of the mould without any particular precautions and then a second stage in which the compression phase is controlled in order to obtain the part in its final form. The applicants have found that it is desirable for the parison formation stage to be carefully controlled in order to obtain perfectly regular parisons with a very precise distribution and an impeccable surface. In fact the applicants have found that such parisons which are devoid of traces on the surface such as weld lines or air bubbles make it possible at a later stage to obtain parts of greatly superior quality to parts made by the previous methods.

Preferably, contact diameters D(t) on each of the two principal surfaces are constantly substantially equal to each other and between $D_o$ and $kd(t)$, where $D_o$ is the contact diameter at the end of stage (a), k is a constant higher than 1 and $d(t)$ represents the thickness of the rough model of the parison in the axis of injection during stage (b).

Parison should be understood to mean the volume of material contained in the mould at the end of the injection stage, before the compression stage.

Tests carried out by the Applicants in accordance with such a method have given complete satisfaction. Furthermore, in a manner which was a priori surprising, it was found that such a method made it possible during the parison compression stage to utilise pressures much lower than the pressures used up until now in injection moulding machines.

This characteristic of the present invention makes it possible in particular to avoid the effect of false injection or "jetting" which is produced when there is total slipping of the jet of material against the walls of the die, that is to say when the speed is practically constant at every point of a section of the injection orifice. It also makes it possible to guarantee that there is no break in the flow at any time.

As a result the parison is formed progressively and regularly, without the material slipping against the surfaces of the mould, but by internal displacement due to the production of heat as the part is produced. Thus the temperature gradients in the parison are preferably optimum before the compression phase.

Preferably, the injection channel is blocked before proceeding to the parison compression stage by moving the piston closer to the opposite principal surface of the mould. Preferably, the method also includes a stage in which the pressure of the piston on the part is maintained after the stage in which the two principal surfaces are brought together in order to shape each part into its final form. Preferably, the method also includes a cooling stage before proceeding to open the mould.

In one preferred embodiment of the present invention, during the stage (b), the speed of displacement of the piston is constant and the output q(t) of material at the position of the injection orifice is defined by an equation, as a function of the intermediate time, between an equation of the form $q(t)=A_1 t + B_1$ and an equation of the form $q(t)=A_2 t^2 + B_2 t + C_2$, where $A_1$, $B_1$, $A_2$, $B_2$ and $C_2$ represent constants and t represents time.

In an alternative preferred embodiment of the present invention, during the stage (b), the output of material at the position of the injection orifice is constant, and the development d(t) of the thickness of the rough model of the parison is given by an equation, as a function of the intermediate time between an equation of the form $d(t)=A_3+(B_3 t+C_3)^{\frac{1}{2}}$ and an equation of the form $d(t)=A_4+(B_4 t+C_4)^{\frac{1}{3}}$ where $A_3$, $B_3$, $C_3$, $A_4$, $B_4$, $C_4$ represents constant and t represents time.

According to a second aspect of the present invention, there is provided apparatus for carrying out the aforesaid method comprising an injection press provided with a mould, the cavity of which is defined by two principal surfaces facing one another, one of which is constituted by a piston which is movable along the axis of injection to vary the volume of the cavity; timing means arranged to immobilise the piston in the proximity of the opposite principal surface of the mould for a given time following the start of the injection of material into the cavity of the mould; and drive means arranged to move the piston away from and closer to the opposite principal surface.

The apparatus also preferably includes a transducer which is sensitive to displacements of the piston, and preferably a mechanical stop unit which limits the movement of the piston towards the opposite principal surface in order to define the thickness of the part. Preferably, the axis of injection is horizontal, and the supply channel is preferably equipped with a throttle to open and close it.

BRIEF DESCRIPTION OF THE DRAWINGS

FIG. 1 is a schematic view in longitudinal section of an injection press in accordance with the present invention, and FIG. 2 is a diagram showing the functioning of a system according to the present invention.

DESCRIPTION OF THE PREFERRED EMBODIMENT

As shown in FIG. 1 injection press plates PF and PM which are respectively fixed and movable extend transversely to the axis of injection A—A which is preferably horizontal. In addition these plates PF and PM are symmetrical with respect to the axis of injection A—A. The fixed plate PF supports a first mould element M. The latter has a concave surface Sca directed towards the movable plate PM and centred on a through bore Ai which is itself aligned with a supply channel CA.

The concave surface Sca constitutes one of the principal surfaces of the mould cavity intended to receive the material. On the periphery of this surface Sca the element M has a flat radial annular surface Sr which is perpendicular to the axis of injection A—A and against which a die L comes to rest during closure of the mould. The die L is borne by the movable plate PM and surrounds a piston P centred on the axis A—A, permitting translation of the latter along the axis A—A.

To the side of the fixed plate PF, the piston P has a convex surface Sve which constitutes the second principal surface of the mould cavity. The convex surface Sve has essentially the same curvature as the concave surface Sca and is also centred on the axis of injection A—A.

The concave and convex surfaces Sca and Sve or principal surfaces of the mould cavity are preferably symmetrical about the axis of injection A—A.

At the position of the internal bore which receives the piston P, the die L has a radial surface in the form of a ring, designated BM, directed towards the movable plate PM, which forms a mechanical stop against which the opposite radial surface of an annular ring Pce on the external periphery of the piston on the side of the movable plate PM comes to rest.

FIG. 1 shows that the co-operation of the mechanical stop unit BM and the external ring of the piston Pce makes it possible to limit the bringing together of the two principal surfaces Sca and Sve of the mould cavity in order consequently to define the thickness of the part in its final form.

The supply channel CA, which is coaxial with the axis of injection A—A and is aligned with the injection bore Ai provided in the element M, is connected to an injection control system CI. Such a system CI can consist of elements which are conventional in themselves such as a device for maintaining temperature and a device for driving the material, of the plasticising machine type or some suitable type. Consequently, the construction of the system CI will not be described in detail.

The supply channel CA is also provided with a throttle B to control opening and closing of the supply channel CA, in dependence upon its position. The supply channel CA passes through the fixed plate PF so as to come into contact with the element M facing the injection bore Ai.

The piston P has a rod T which extends in a direction away from the fixed plate PF and which is coaxial with the axis of injection A—A, passing through the movable plate PM. On the opposite side of the movable plate PM to the fixed plate PF the rod T has a disc D which is accommodated in the internal chamber Chi of a jack V. The cylinder C of the jack V is supported by the movable plate PM on the opposite side to that facing the fixed plate PF. The external periphery of the disc D is in sealed contact with the internal surface of the cylinder C.

A translation movement of the piston P along the axis of injection A—A is effected by varying the fluid pressure inside the internal chamber Chi of the jack V by means of a jack control system CV shown schematically in FIG. 1.

A transducer Tr which is sensitive to displacements of the piston P is functionally connected to one end of the rod T extending beyond the cylinder C of the jack V. Naturally, other arrangements could be used. Finally, as shown in FIG. 1, a central unit UC connected to the injection control system CI, the jack control system CV and the transducer Tr controls the different parameters of the injection and the compression of the parison.

The central unit UC has a preferably linear transducer which displays the displacements of the piston, adjustable timing means arranged to regulate the duration of each of the stages of the method, and in particular to control the time $T_1$ of the immobilisation of the piston, as well as means for displaying each of these duration. The control of the piston is advantageously achieved by means of two potentiometers with digital display, one of which controls the amplitude of the displacement, and the other the speed.

The different elements of the apparatus which has just been described define three positions for the piston P. The first position, referred to as the retracted position, permits ejection of the parts. The second position referred to as the intermediate position, is obtained after maximum retraction of the piston P towards the movable plate PM during injection, that is to say before the compression phase, and permits formation of the parison. Finally, the third position, referred to as the "zero point", and which corresponds to the position shown in FIG. 1 is a position of rest against the mechanical stop unit BM when the mould is closed, and permits the definition of the thickness of the finished part.

The method of producing parts made from a plastics materials in accordance with the present invention will now be described with the aid of the schematic diagram shown in FIG. 2.

In a first stage the throttle B is opened (an operation which takes priority over the start of injection), the mould is closed by bringing the movable and fixed plates PM and PF together so that the die L and the element M come into contact at a junction plane. The piston P is then advanced in the direction of the fixed plate PF to a small distance $d_o$ from the opposite principal surface Sca of the mould. This distance $d_o$ is controlled by the transducer Tr, the jack control system CV and the central unit UC.

The system is then ready for the injection stage controlled by the injection control system CI and the centraL unit UC.

As shown in FIG. 2, simultaneously with the injection stage, the method includes successively producing an immobilisation of the piston P at the distance $d_o$ from the mould surface Sca, and then the retraction of the piston P towards the movable plate PM. More precisely, the immobilisation of the piston P at the distance $d_o$ from the opposite principal surface Sca of the mould is carried out during a time $T_1$ which is defined as a function of the injection output, the viscosity of the material and the geometry of the mould cavity in order to form a rough model of the parison which is symmetrical about the axis of injection A—A and has respective contact diameters which are substantially identical on each of the two principal surfaces Sca and Sve.

In the case where the principal surfaces of the mould cavity are not planar or not symmetrical about the axis A—A, the contact diameter should be understood to be the length of a straight line passing through the axis of injection A—A, perpendicular to the latter and joining two extreme contact points of the material on the principal surfaces. These extreme points are substantially symmetrical with respect to the axis A—A.

The retraction of the piston P, moving away from the opposite principal surface Sca, is carried out at a speed $v(t)$ defined as a function of the output $q(t)$ in such a way that on the one hand the rough model of the parison always remains symmetrical and is never reduced in diameter and on the other hand the respective contact diameters $D(t)$ on each of the two principal surfaces Sca and Sve of the mould are constantly substantially equal to each other and between $D_o$ and $kd(t)$. In this connection, $D_o$ represents the contact diameter of the rough model of the parison on the principal surfaces Sca and Sve at the end of stage (a) of immobilisation of the piston; k is a constant higher than 1 and $d(t)$ represents the thickness of the rough model of the parison along the axis of injection A—A for the entire duration of stage (b) of retraction of the piston.

Stage (a) permits filling of the supply channel CA and the injection bore Ai and avoids the effect of "jetting" of false injection.

Stage (b) makes it possible to avoid any break in the flow and to form a parison which is symmetrical and regular.

The parison obtained at the end of the injection stage should then have a perfect surface as has been indicated above.

The stages (a) and (b) respectively of immobilisation of the piston P and retraction of the piston P are controlled by the central unit UC as a function of the data delivered by the trasducer Tr, the jack control system CV and the injection control system CI.

The throttle B is then closed in order to stop the injection and to prevent the material from flowing back.

The piston P is then advanced in the direction of the fixed plate PF in order to compress the parison and shape the part into its final form. The advance of the piston P is stopped when it comes to rest against the mechanical stop unit BM. The pressure of the piston P on the part is then maintained for a predetermined period referred to as the holding stage.

This stage is followed by a cooling phase. During the course of this the moulded part is cooled and its temperature approaches that of the mould. The mould is then opened and the part ejected after moving the piston into the retracted position and if necessary applying compressed air to assist removal of the formed part.

After a period referred to as the intercycle, the system is ready for a new cycle.

The applicants have also discovered that during the injection phase, in cases where the principal surfaces have substantially identical curvature in order to form parts of quasi-constant thickness, the contact diameter $D(t)$ on the principal surfaces of the cavity of the mould, the speed $v(t)$ of retraction of the piston or the thickness $d(t)$ and the volumetric output $q(t)$ should preferably conform to the following relationships.

In order to proceed with the production of a parison with a constant contact diameter $D(t)$ and a constant piston retraction speed $v(t)$ during the stage (b), the output of the material $q(t)$ must be substantially linear, that is to say having the form $At + B$.

Keeping the contact diameter D constant, but with a constant output $q(t)$, it is preferable to ensure a variation of the thickness $d(t)$ of the rough model of the parison of the form $A + (Bt + C)^{\frac{1}{2}}$ during the retaraction stage (b).

On the other hand, whilst ensuring that the shape of the rough model of the parison is maintained for the entire duration of the injection stage (b), that is to say ensuring a linear variation of the contact diameter $D(t)$ as a function of the variation of the thickness $d(t)$ of the rough model of the parison, with a constant piston displacement speed $v(t)$ it is preferable to ensure a variation of the injection output $q(t)$ of the form $At^2 + Bt + C$ and, using a constant output $q(t)$, to ensure a variation in the thickness of the rough model of the parison $d(t)$ of the form $(At + B)^{\frac{1}{2}}$.

On the basis of these relationships a choice of the injection speeds and pressures is made as a function of the geometry of the part and the plastics material being used.

For amorphous and highly viscous products, it is convenient to provide a mean injection period which is slow, whilst for crystalline products rapid injection is necessary. In both cases, and because of the large clearance in the mould, regulation of the correct speed can be obtained by modulating the injection pressure.

In addition, for fluid and crystalline products it is desirable to choose a low value for the retraction of the piston and by contrast to choose a high value for retraction for materials having a high molecular weight. The piston retraction speed will preferably be a maximum of 50 mm/second. In general tests have shown that a timing period $T_1$ of the order of 2/10 seconds seems correct.

Furthermore, on the basis of the relationships set out above, the applicants have found that for a constant piston retraction speed v(t) during stage (b), the output q(t) of material at the position of the injection orifice should be defined by an equation as a function of the intermediate time between an equation of the form:

$$q(t) = A_1 t + B_1 \quad (1)$$

and an equation of the form:

$$q(t) = A_2 t^2 + B_2 t + C_2 \quad (2)$$

in which $A_1$, $B_1$, $A_2$, $B_2$ and $C_2$ are constants and t represents the time.

On the other hand, for a constant output q(t) of material at the position of the injection orifice during the piston retraction stage (b), the development d(t) of the thickness of the rough model of the parison should be intermediate between an equation of the form:

$$d(t) = A_3 + (B_3 t + C_3)^{\frac{1}{2}} \quad (3)$$

and an equation of the form:
$$d(t) = A_4 + (B_4 t + C_4)^{\frac{1}{2}} \quad (4)$$

in which $A_3$, $B_3$ and $C_3$, $A_4$, $B_4$ and $C_4$ are constants and t represents the time.

Naturally it is also possible for the speed of injection and retraction of the piston P to be modulated simultaneously in order to obtain a correct parison on the basis of these data.

The present invention is not limited to the embodiments described and numerous adaptations are possible. Thus, for example, the displacement of the piston P can be controlled not only by a jack but step by step by a system of cams or motors.

Experiments have shown that the apparatus and the method according to the present invention also make it possible to mould materials which up until now have been capable only of processing by extrusion (material having a very high viscosity) and therefore impossible to shape by the normal injection technique.

The precise parameters of a particular method of production given by way of non-limiting example are set out below.

projected surface of the part: 190 cm$^2$,
average thickness of the part: 2 mm,
nature of the plastics material used: terpolymer acrylonitrile butadiene styrene (ABS),
pressure of closing the mould: 10 T,
injection pressure: 400.10$^5$ Pa,
injection output: 35 g/s,
temperature or viscosity of the injected material: 0.58 g/10 mm Standard ASTMD 1238,
duration $T_1$ of the immobilisation of the piston P: 11/100 s,
distance $d_o$: 2 mm,
duration of the retraction of the piston P: 83/100 s,
speed of retraction of the piston P: 24 mm/s,
amplitude of the retraction of the piston: 20 mm,
duration of the advance of the piston P for the compression stage: 4/10 s,
speed of the advance of the piston P for the compression stage: 50 mm/s,
force of compression of the piston: 9 T,
duration of the holding stage and the cooling stage: 8 s,
duration of a total cycle: 16 s.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method of producing a part from a plastics material, using an injection press including a mould member having a cavity, a piston, and an injection inlet leading along an injection axis to said mould cavity, said mould cavity being defined by two principal surfaces facing each other, one of said principal surfaces consisting of a surface of said piston and the opposite said principal surface consisting of a surface of said mould member, said piston being movable relative to said mould member to vary the volume of said mould cavity; said method comprising:

injecting a plastics material into said mould cavity to form a parison in an injection stage,
   immobilising said piston during said injecting stage at a short distance from said opposite principal surface thereby forming a rough model of said parison, said model being symmetrical about said injection axis and having identical contact diameters on each of said two principal surfaces,
   subsequently retracting said piston, still during said injection stage, thereby distancing said piston from said opposite principal surface, said retraction being effected at such a speed that on the one hand said rough model is not reduced in diameter and on the other hand the contact diameters of said rough model on each of said principal surfaces are constantly equal to each other and have values between a constant value and an increasing linear variation, as a function of the thickness of said rough model,
   moving said piston towards said opposite principal surface thereby compressing said parison to shape said part into its final form.

2. A method according to claim 1 further including a stage consisting of blocking said inlet before bringing said piston closer to said opposite principal surface in order to compress said parison.

3. A method according to claim 1 wherein the pressure of said piston on said part is maintained after said piston has been moved towards said opposite principal surface to shape said part into its final form.

4. A method according to claim 3 which further includes allowing said shaped part to cool before proceeding to open said mould (M, L, P).

5. A method according to claim 1 wherein, during said retraction of said piston the speed of displacement of said piston is constant and the output q(t) of material at the position of said injection inlet is defined by an equation, as a function of the intermediate time, between an equation of the form $q(t)=A_1t+B_1$ and an equation of the form $q(t)=A_2t^2+B_2t+C_2$, where $A_1$, $B_1$, $A_2$, $B_2$, $C_2$ represent constants and t represents time.

6. A method according to claim 1 wherein, during said retraction of said piston the output q(t) of material at the position of said injection inlet is constant and the development d(t) of the thickness of said rough model of said parison is given by an equation, as a function of the intermediate time, between an equation of the form $d(t)=A_3+(B_3t+C_3)^{\frac{1}{2}}$ and an equation of the form $d(t)=A_4+(B_4t+C_4)^{\frac{1}{3}}$ where $A_3$, $B_3$, $C_3$, $A_4$ $B_4$ and $C_4$ are constants and t represents time.

7. Apparatus for producing a part from a plastics material, said apparatus comprising an injection press including a mould member having a cavity, a piston, and an injection inlet leading along an injection axis to said mould cavity, said mould cavity being defined by two principal surfaces facing each other, one of said principal surfaces consisting of a surface of said piston and the opposite said principal surface consisting of a surface of said mould member, said piston being movable relative to said mould member to vary the volume of said mould cavity; and further comprising timing means arranged to immobilise said piston at a short distance from said opposite principal surface following the beginning of said injection of said material into said cavity, and drive means arranged to displace said piston away from said opposite principal surface after said beginning of said injection and during the subsequent injection and then to displace said piston towards said opposite principal surface.

8. Apparatus according to claim 7 further includes a transducer which is sensitive to the displacement of said piston.

9. Apparatus according to claim 7 further including a mechanical stop unit, which limits the movement of said piston towards said opposite principal surface.

10. Apparatus according to claim 7 wherein said injection axis is horizontal.

11. Apparatus according to claim 7 further including a throttle in a material supply channel to said injection inlet, to block it.

* * * * *